US006970832B1

(12) United States Patent
Dean et al.

(10) Patent No.: US 6,970,832 B1
(45) Date of Patent: Nov. 29, 2005

(54) CONFIGURATION OF COMPUTER SYSTEMS BASED UPON PURCHASER COMPONENT NEEDS AS DETERMINED FROM PURCHASER DATA ENTRIES AND HAVING A TIERED STRUCTURE OF FINANCIAL INCENTIVE LEVELS AUTOMATICALLY PROVIDED FROM DISTRIBUTER TO SYSTEM RESELLERS

(75) Inventors: Jeffrey Randell Dean, Austin, TX (US); Jeffrey Langdon Howard, Austin, TX (US); Rene Neumann, Austin, TX (US); Ingrid Milagros Rodriguez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 658 days.

(21) Appl. No.: 09/282,616

(22) Filed: Mar. 31, 1999

(51) Int. Cl.[7] .............................................. G06F 17/60
(52) U.S. Cl. .......................................... 705/14; 705/26
(58) Field of Search ..................................... 705/14, 26

(56) References Cited

U.S. PATENT DOCUMENTS 4,799,156 A * 1/1989 Shavit et al. .................. 705/26
5,257,387 A * 10/1993 Richek et al. ............... 713/600

OTHER PUBLICATIONS

"Rebates: Baiting the channel—Vendors hook distributors", Computer Reseller News, Jun. 16, 1997, p. 1.*

* cited by examiner

Primary Examiner—Donald L. Champagne
(74) Attorney, Agent, or Firm—Jerry B. Kraft; Leslie Van Leewen; Mark S. Walker

(57) ABSTRACT

A distributer of the computer components, which has developed the process for configuring computer systems or networks, provides to the seller or reseller a configuration process comprising a prompting system for computer purchasers to make a sequence of interactive data entries, each of said entries relative to the data processing needs of the purchaser of one of said computer systems, allocating said computer components to said computer systems based upon said user entries, and tracking the quantities of said computer components thereby allocated to computer systems sold by said seller to said purchasers during a selected time period. There is presented to the seller a tiered structure of financial incentive levels offered by the distributer based upon said quantities of allocated computer components and enabling the distributer to dynamically modify the levels of said tiered structure of financial incentives. Further means are included for enabling the seller to offer to the purchasers financial incentives for accepting seller proposed modifications in said allocated quantities of components to thereby permit the seller to reach said incentive levels. With such a configuration system, the distributor, seller and purchasers are afforded the ongoing opportunity to adjust or "tune" their needs in order to maximize their financial benefits.

24 Claims, 10 Drawing Sheets

FIG.5

Backup Schedule

Your data will automatically be backed up at the times you indicate below. Online backup means your data will be copied to a computer system at another location. Tape backup means your data will be copied to magnetic tape and stored at another location. Backup should be done at a time when people are not working on the system. Type the times below that are outside of your normal working hours.

― Scheduling ―
How early do employees start work?
[6:00AM] ― 67
How late do employees leave work?
[8:30PM] ― 68
How often do you want to back up your data?
[Sundays Only]

[Help] [< Back] [Next >] [Cancel]

FIG.6

Data Security

To make sure that your data is secure, you will be asked to type a key (password) to access the data that Connected Online Backup has stored for you. The key can be any combination of up to ???? characters, with no spaces. For future reference, make a note of the key and indicate if you have used upper or lower case characters. For added safety, you can store a copy of the key with the Connected Online Backup service by checking the box below.

― Data Encryption ― 69
Key [xxxx]
Retype Key [xxxx]
Store the Key Offsite also [ ]
― 70

[Help] [< Back] [Next >] [Cancel]

CONFIGURATION OF COMPUTER SYSTEMS BASED UPON PURCHASER COMPONENT NEEDS AS DETERMINED FROM PURCHASER DATA ENTRIES AND HAVING A TIERED STRUCTURE OF FINANCIAL INCENTIVE LEVELS AUTOMATICALLY PROVIDED FROM DISTRIBUTER TO SYSTEM RESELLERS

CROSS-REFERENCE TO RELATED PATENT APPLICATIONS

The following copending patent applications, which are assigned to the same assignee as the present invention, cover subject matter related to the subject matter of the present patent application: Ser. No. 08/159,954, filed Sep. 24, 1998, entitled *Tracking of Computer Components Allocated During Configuration of Computer Systems and Networks by a Simplified User Friendly Configuration Process,* to Dean, Howard and Rodriguez; and, Ser. No. 09/282,615, filed concurrently with the present application, entitled *Configuration of Computer Systems Based upon Purchaser Component Needs as Determined from Purchaser Data Entries Correlated with a Set of Seller Business Rules to Optimize Quantities of Each Component Sold,* to Dean, Howard and Rodriguez.

TECHNICAL FIELD

The present invention relates to a process and program for the configuration of computer systems and networks provided to purchasers of systems through resellers of distributers' computer components.

BACKGROUND OF RELATED ART

Computers and their application programs are used in all aspects of business, industry and academic endeavors. In recent years, there has been a technological revolution driven by the convergence of the data processing industry with the consumer electronics industry. This advance has been even further accelerated by the extensive consumer and business involvement in the Internet. As a result of these changes, it seems as if virtually all aspects of human productivity in the industrialized world require human/computer interaction. The computer industry has been a force for bringing about great increases in business and industrial productivity. Almost every week seems to bring computer industry advances which promise even further increases in productivity. These advances offer to drive down business and industry costs and increase efficiency, in addition to increasing productivity. In addition, the cost of "computer power" continues to drop as a result of rapid advances in computer related technologies.

Despite all of these advantages, there still remains great resistance in all industries and business fields to new computer systems and significant system upgrades which offer much in productivity increases. This resistance results from past experience which equates installing new computer systems or significant upgrades in existing systems with large amounts of down time; during which the business, manufacturing facility or individual worker functions are inoperative or operate at diminished levels. When a business or production facility is trying to decide whether to install a new computer system, the concern about down time, the possible loss of business, as well as stress on the workers involved, very often outweighs the cost of the installation in influencing the decision. The concern about business and production delays resulting from installation has become so great that fewer and fewer small businesses are trying to make system and program changes on their own. This concern is even greater when the business is considering the installation of a computer network. While many businesses would likely be much more productive if their computers were interconnected with each other, the thought of a network may be very frightening to many small businesses without too much computer experience.

As a result of these needs, the professional computer service industry, which carries out and supports installations and upgrades for the business and industrial sectors, has been rapidly expanding over the past decade. However, even with such computer professional support, the threat of such down time, coupled with the costs of such professional services caused by installation delays, remains of great concern.

Because of this expanding demand for computer and network installations, many major manufacturers and distributors of computer components, both hardware and software, have been expending great amounts of research and development effort to develop programming systems and tools to expedite such computer system and network configuration installation and upgrades. Such distributors need to be adequately compensated for their expenditures through the sale of their components used in the systems. On the other hand, there have arisen substantial numbers of seller or "reseller" computer installation organizations which market the installation and upgrade of computer systems and networks to businesses. Since businesses demand and expect the best total solutions for their needs from such resellers, it is often the case that the best computer system or network that the reseller installs uses few or no computer components manufactured or distributed by the developer and owner of the system and programs used to configure the system or network. The result is a dilemma for those involved in the installation and configuration of computer systems and networks. It would be advantageous for everyone in the industry to continue to use the programs and systems for the configuration of networks and to encourage the development of even more advanced systems and programs to do so. On the other hand, a way should be found for compensating the developers of such programs for their efforts. The above-referenced copending application Ser. No. 08/159,954 offered one solution. The distributer or manufacturer of the computer components that has developed the process for configuring computer systems or networks, provides to the seller or reseller a configuration process comprising a prompting system for computer purchasers to make a sequence of interactive data entries, each of said entries relative to the data processing needs of the purchaser of one of said computer systems, allocating said computer components to said computer systems based upon said user entries, tracking the quantities of said computer components thereby allocated to computer systems sold by said seller to said purchasers during a selected time period and determining to forego fees due from said seller to said distributer for said process when said quantities of components thereby allocated during said time period exceed a selected level.

SUMMARY OF THE PRESENT INVENTION

The present invention provides a solution which is more comprehensive than the solution just described above. In the present invention, the distributer or manufacturer of the computer components that has developed the process for configuring computer systems or networks, still provides to the seller or reseller a configuration process comprising a prompting system or computer purchasers to make a sequence of interactive data entries, each of said entries relative to the data processing needs of the purchaser of one of said computer systems, allocating said computer components to said computer systems based upon said user entries and tracking the quantities of said computer components thereby allocated to computer systems sold by said seller to said purchasers during a selected time period. However, the present system combines the additional functions of presenting to the seller a tiered structure of financial incentive levels offered by the distributer based upon said quantities of allocated computer components and enabling the distributer to dynamically modify the levels of said tiered structure of financial incentives. Further means are included for enabling the seller to offer to the purchasers financial incentives for accepting seller proposed modifications in said allocated quantities of components to thereby permit the seller to reach said incentive levels. With such a configuration system, the distributor, seller and purchasers are afforded the ongoing opportunity to adjust or "tune" their needs in order to maximize their financial benefits. The seller can work within the tiered structure to get the best financial deal that his sales and circumstances permit. The purchasers have the options of taking advantage of the financial incentives offered to them by the seller so that the sellers may achieve their goals, and the distributor has the capability of dynamically modifying the levels in his financial incentive structure in order to pursue his goals. Toward this overall purpose, the present system further provides means for enabling the seller to modify quantities of said components allocated responsively to said tracked quantities in relation to said tiered structure of financial incentives.

The system of the present invention is particularly effective when used in communication networks such as the Internet with the distributer, sellers and purchasers all connected into the network respectively through computer display stations on the network.

In addition, the system may be set up to automatically credit the financial incentives to sellers as soon as the appropriate levels are reached.

BRIEF DESCRIPTION OF THE DRAWINGS

The present invention will be better understood and its numerous objects and advantages will become more apparent to those skilled in the art by reference to the following drawings, in conjunction with the accompanying specification, in which:

FIGS. 3 through 10 are a series of dialog panels prompting users to make some typical illustrative data entries which the process involving the present invention uses to allocate computer components;

FIG. 3 is a dialog panel for adding users to the network configuration;

FIG. 4 is an illustrative dialog panel for organizing users according to work groups;

FIG. 5 is an illustrative dialog panel for providing first-in/last-out employee information to provide time for backup and other off-time functions;

FIG. 6 is an illustrative dialog panel for the setting up of data security;

FIG. 7 is an illustrative dialog panel for establishing user profiles;

FIG. 8 is a diagrammatic view of an interactive dialog screen on a purchaser's display station for the entry of data relative to another application;

FIG. 9 is a diagrammatic view of an interactive dialog screen on a purchaser's display station for the entry of data relative to application programs to be installed on purchaser's client computers;

FIG. 10 is a diagrammatic view of an interactive dialog screen on a purchaser's display station for the entry of data relative to an accounting application program to be installed on the purchasers' client computers;

DETAILED DESCRIPTION OF THE PREFERRED EMBODIMENT

Figure 1:
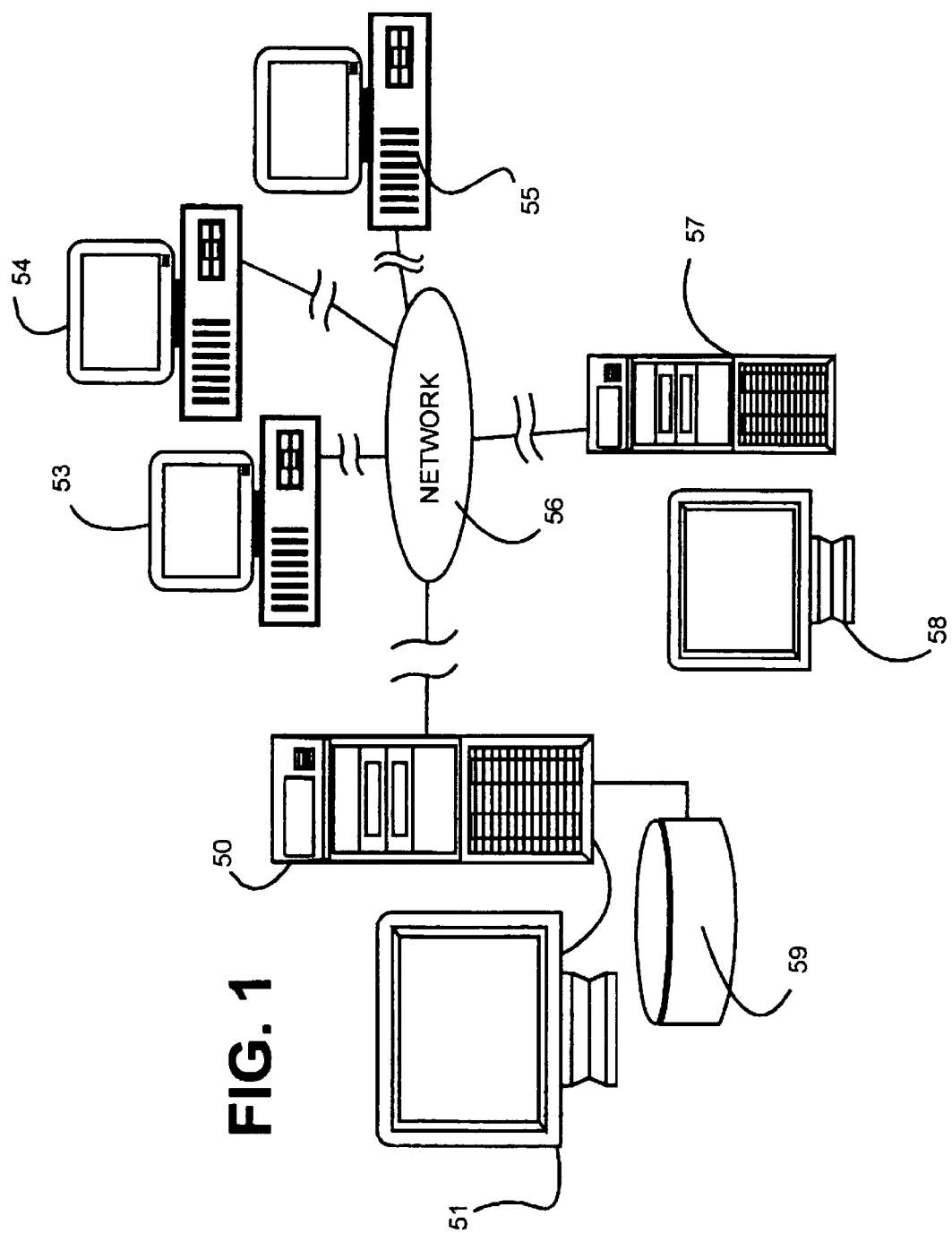
FIG. 1 is a generalized diagrammatic view of a network of computers which may be configured by a distributer provided process tracking computer component levels according to the present invention and includes display stations through which the sellers, distributers and purchasers may access the process.

With reference to FIG. 1 there is shown a representative diagram of a network connecting the reseller, his purchasers and the distributer which is similar to that used to illustrate the network configuration process of the above-referenced copending patent application Ser. No. 08/159,954 involving allocation of computer components. The present invention, involving the tracking of the allocated computer components, will be illustrated with respect to this embodiment. The purchasers who will be inputting the data, the sellers or resellers and the distributer are linked to each other through a network 56, which may be a Wide Area Network (WAN) such as the Internet or a Local Area Network (LAN). In the simplified illustrative illustration shown in FIG. 1, assume that the purchasers are inputting information through computer display terminals 53, 54 and 55, a reseller is accessing data through server 50 and display terminal 51, and the distributer has access to data through server 57 and display terminal 58. As will be subsequently described with respect to FIGS. 3 through 10, all configuration entries and settings from the purchasers on terminals 53 through 55 are transmitted to and stored in reseller server 50. With respect to the allocation of software computer components, as will be seen from the subsequent description, all of the software components to be allocated and distributed over the network may be stored in association with server 50, e.g. in its storage facility 59, and then distributed as needed to the network users who will sign onto the purchaser stations 53 through 55. The server 50 will allocate the appropriate software components to the users at the appropriate purchaser terminals. The programs to be subsequently described, which track the allocation of such software components, will store the allocation data in storage facility 59. As will be described in the details of server 50 with respect to FIG. 2, the server has access to networks such as the Internet, and additional components needed for any configuration may be accessed over such networks. Even when all of the components are software computer components, e.g. programs used are stored in server 50, the number and types of allocated software programs may, of course, vary since such numbers are measured by the number of times the process makes copies of such software for the multiple users within the purchaser to which such programs are being allocated. The process of the invention tracks the types and quantities of the software programs used and stores this information conveniently in storage facility 59.

The process of the present invention also allocates and tracks hardware components including displays, printers, disk drives and other storage devices, as well as internal computer components. The allocated hardware may be installed into the system being configured from local inventories or the components may be shipped to the reseller for installation. In any case, data on the types and quantities allocated is tracked and stored. The distributer has access to the allocation data stored in association with the reseller on storage facility 59 through the network connection 56 to the distributer's server 57.

Figure 2:
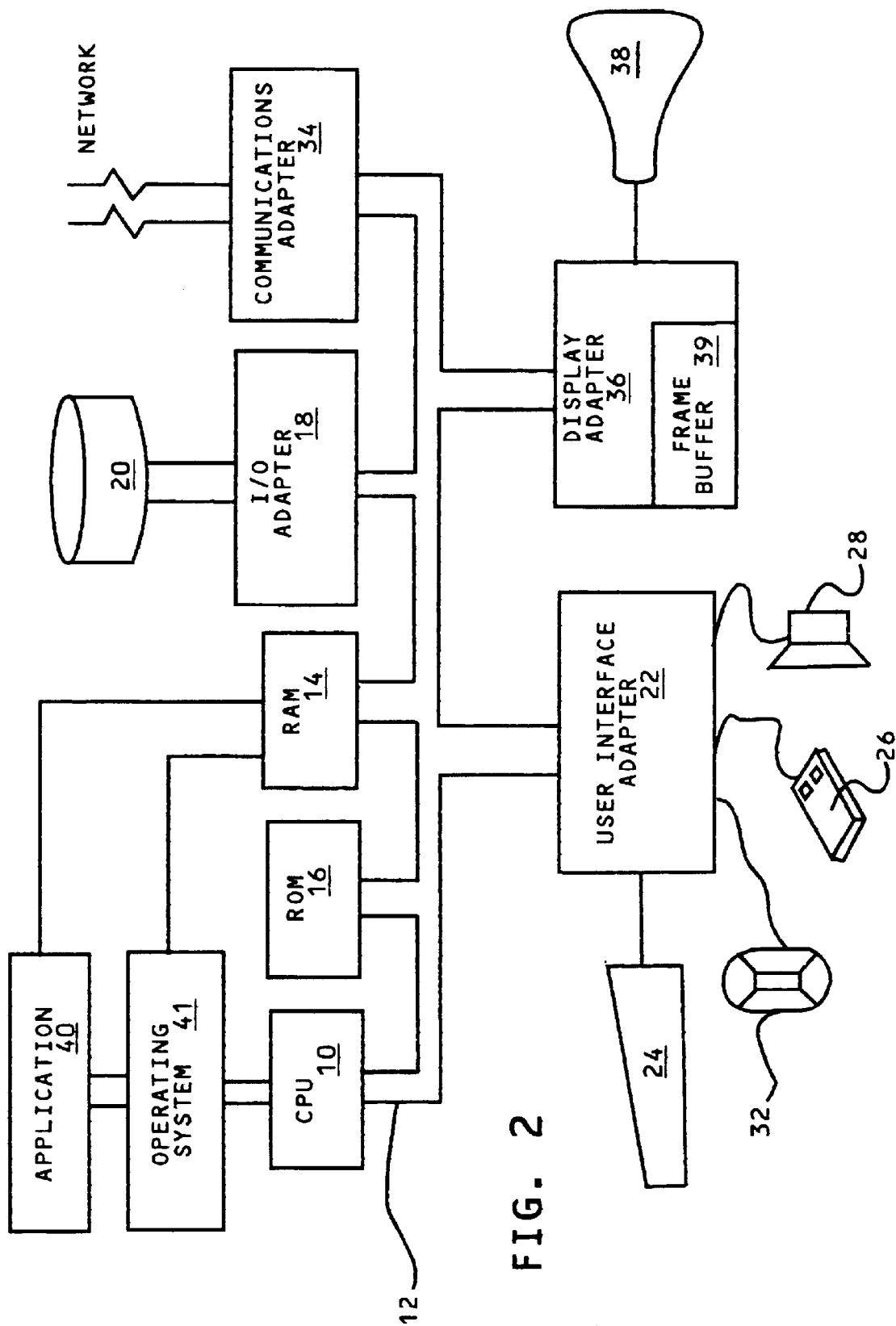
FIG. 2 is a block diagram of an interactive data processor controlled workstation display system including a central processing unit which is capable of serving as the primary server through which the seller may track the allocation of components in the network of FIG. 1.

FIG. 2 is a diagram of a display interface workstation which can function as the reseller's primary server terminal 50, 51. It will be understood that similar workstations may function as the distributer's server terminal 57, 58 or any of the purchasers' display terminals 53 through 55. A central processing unit (CPU), such as in one of the PC Server series of workstations available from International Business Machines Corporation (IBM), or the Poweredge 2200 ("Poweredge 2200" is a trademark of Dell Corporation) server from Dell Corporation, is provided and interconnected to various other components by system bus 12. An operating system 41 runs on CPU 10 and provides control and is used to coordinate the function of the various components of FIG. 2. Operating system 41 may be one of the commercially available operating systems such as Microsoft's Windows NT™, IBM's NetView™ or Novell's NetWare™. UNIX or AIX Network operating systems may also be used. The programming application for controlling all of the entries and consequent allocations, and for tracking the computer components to be subsequently described for FIGS. 3 through 10, application 40 runs in conjunction with operating system 41 and provides output calls to the operating system 41 which implement the various functions to be performed by the application 40. A read only memory (ROM) 16 is connected to CPU 10 via bus 12 and includes the basic input/output system (BIOS) that controls the basic computer functions. Random access memory (RAM) 14, which will provide for a portion of the basic storage of entries, as well as for part of the storage of data as to allocated computer components to be subsequently described; I/O adapter 18 and communications adapter 34 are also interconnected to system bus 12. It should be noted that software components, including the operating system 41 and the application 40, are loaded into RAM 14, which is the computer system's main memory. I/O adapter 18 conventionally communicates with the disk storage device 20, i.e. a hard drive which may also be involved in the subsequently described storage. Communications adapter 34 interconnects bus 12 with the rest of the network described in FIG. 1 enabling the data processing system to communicate with the other servers and client computers to control entry configurations and allocations to be subsequently described. Communications adapter 34 will also function to connect server 50 to a network, such as the Internet, over which additional allocated software computer components may be received if needed.

I/O devices are also connected to system bus 12 via user interface adapter 22 and display adapter 36. Keyboard 24, trackball 32, mouse 26 and speaker 28 are all interconnected to bus 12 through user interface adapter 22. It is through such input devices that the user interactive functions involved in the present invention may be implemented. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38.

There will now be described with respect to the display screens of FIGS. 3 through 10, some simple illustrations of how the data entries are made through which computer components are allocated and tracked so that the resulting data may be used to determine whether resellers have reached any of their incentive levels. When the screen images are described, it will be understood that these may be rendered by storing an image and text creation programs, such as those in any conventional window operating system in the RAM 14 of the system of FIG. 2. The operating system is diagrammatically shown in FIG. 2 as operating system 41. Display screen images are presented to the viewer on display monitor 38 of FIG. 2. In accordance with conventional techniques, the user, i.e. the purchaser making entries through terminals 53 through 55, may control the screen interactively through a conventional I/O device, such as mouse 26 of FIG. 2, which operates through user interface 22 to call upon programs in RAM 14 cooperating with the operating system 41 to create the images in frame buffer 39 of display adapter 36 to control the display on monitor 38.

Now, with respect to FIGS. 3 through 7, we will illustrate some of the typical data entries used in the process of the above-mentioned copending application Ser. No. 08/159,954, as well as in another related application: Ser. No. 09/118,208, Configuring Computer Network Operations Based Upon the Correlation of a Sequence of Interactive Display User Entries Apparently Unrelated to Computer Operations, filed on Jul. 17, 1998. The data is solicited from users so that computer components may be allocated among the purchasers in the network. With respect to FIGS. 8 through 10, we will illustrate some entries used in the process of another copending application Ser. No. 09/078,934, filed May 14, 1998, A Stored File of Recorded Keystrokes and Cursor Selections for Controlling Automatic Installation and Configuration of Programs and Components in a Network of Server and Client Computers, to Benzanson, Chuang and Rodriguez. The illustrations will show allocations within a small business network. Please note with respect to FIG. 1 the data entry panels shown in FIGS. 3 through 10 may be interactively shown to purchasers on any of the displays of stations 53 through 55.

Figure 3:
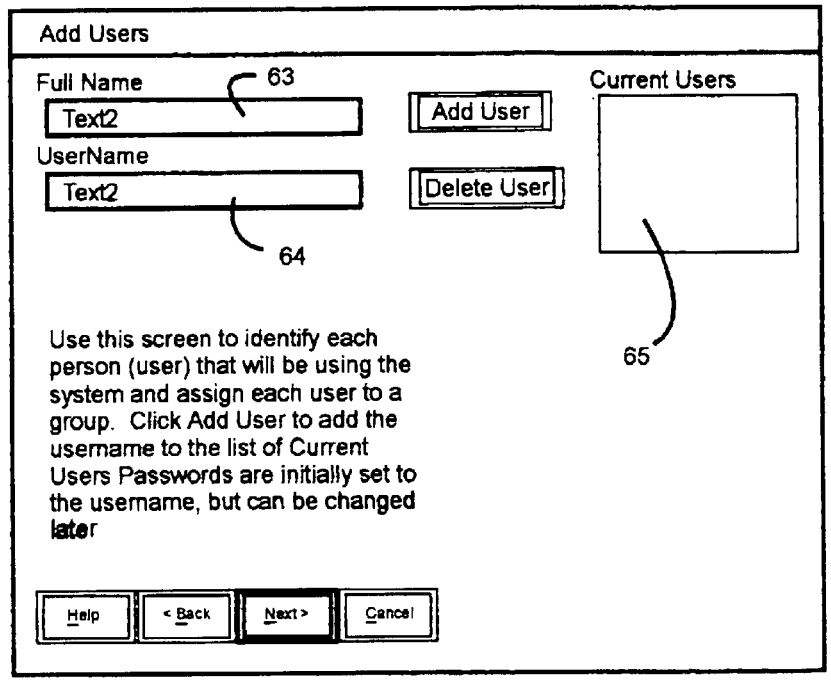
Figure 4:
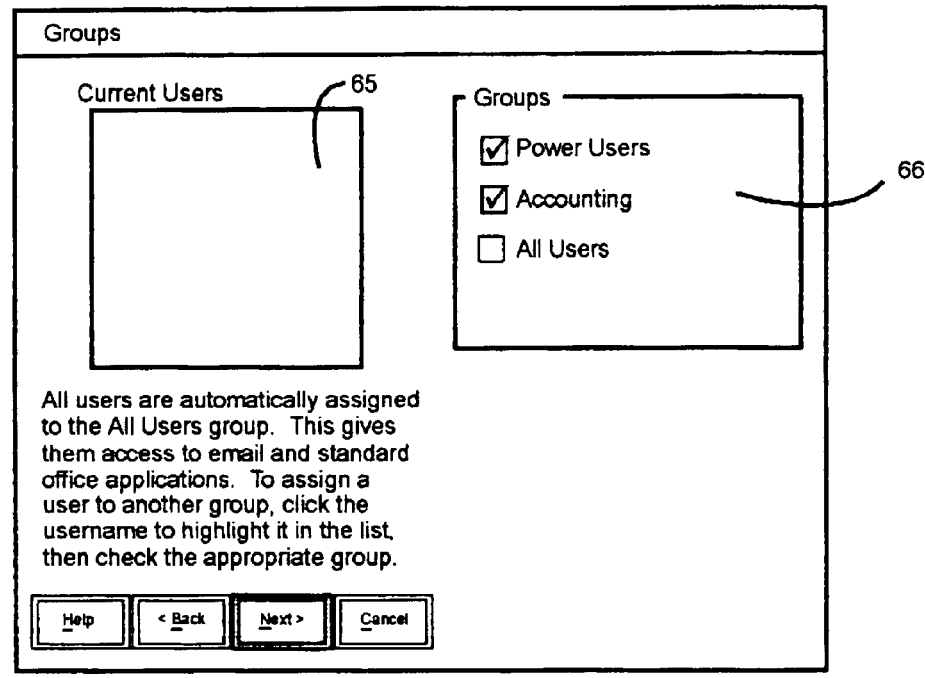
Figure 7:
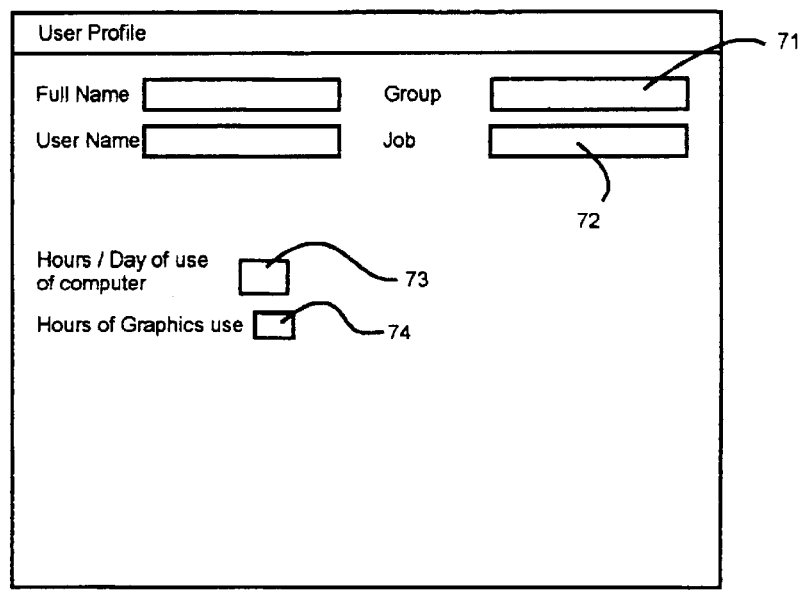

FIG. 3 shows a display panel through which the current users 65 may be organized in the purchaser's organization, and new users may be entered through data entry fields 63 and 64. FIG. 4 is a display panel through which the users 65 may be assigned to functional groups 66 so that this information may be used to allocate program resources. Next, the user may be prompted with a panel, FIG. 5, which will be used to allocate system backup. It prompts for employee start/leave information via data entry fields 67 and 68 so that this information may be used to set likely computer quiescent periods for backing up stored computer data. Such quiescent periods may also be used for other off use functions such as defragmentation of files stored on disk drives, the general cleaning up of files and other housekeeping functions, such as the running of antivirus routines.

The user may also be presented with a data security display panel, FIG. 6, in which data encryption key entries 69 and 70 are prompted for. In the data entry panel of FIG. 7, group and job function information entries 71 and 72 are prompted for, which will be used to allocate programs for the particular user. Also, the employee's computer hours are solicited 73, and, particularly, graphic hours 74 are important since the system may use this information in an algorithm for setting aside storage space to store and support the user's activities.

Figure 8:
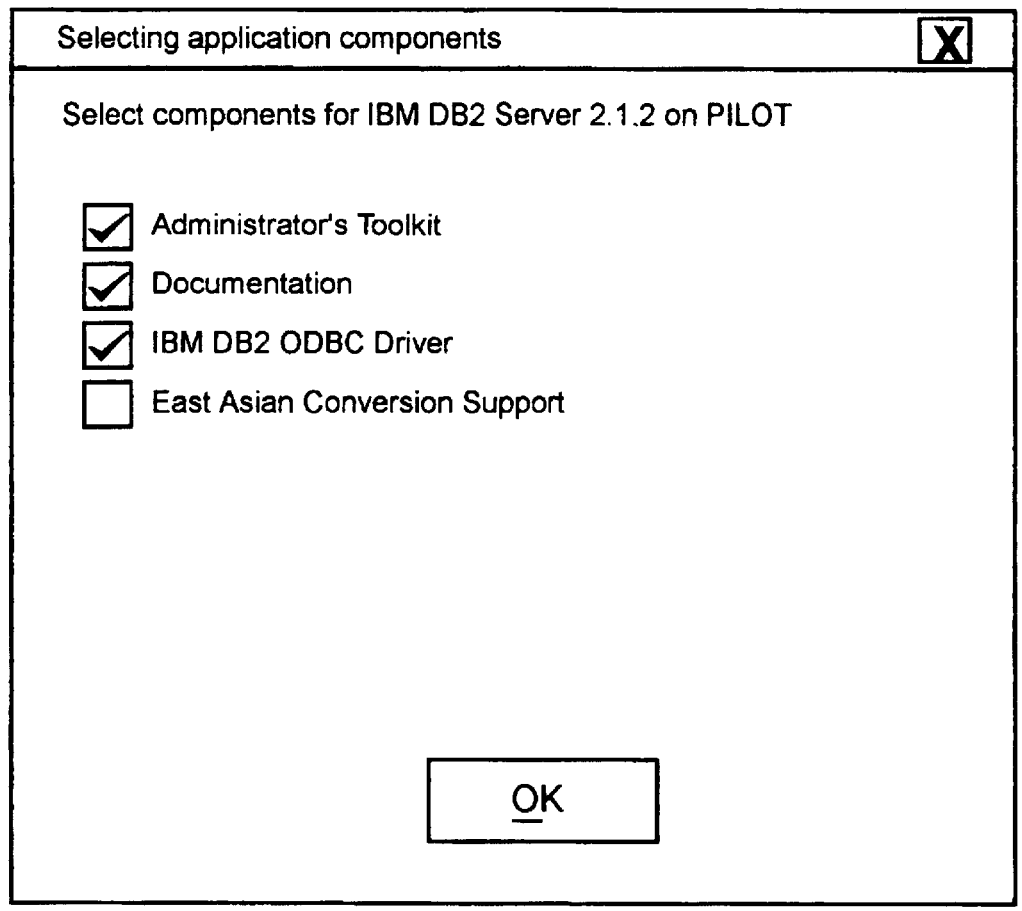
Figure 9:
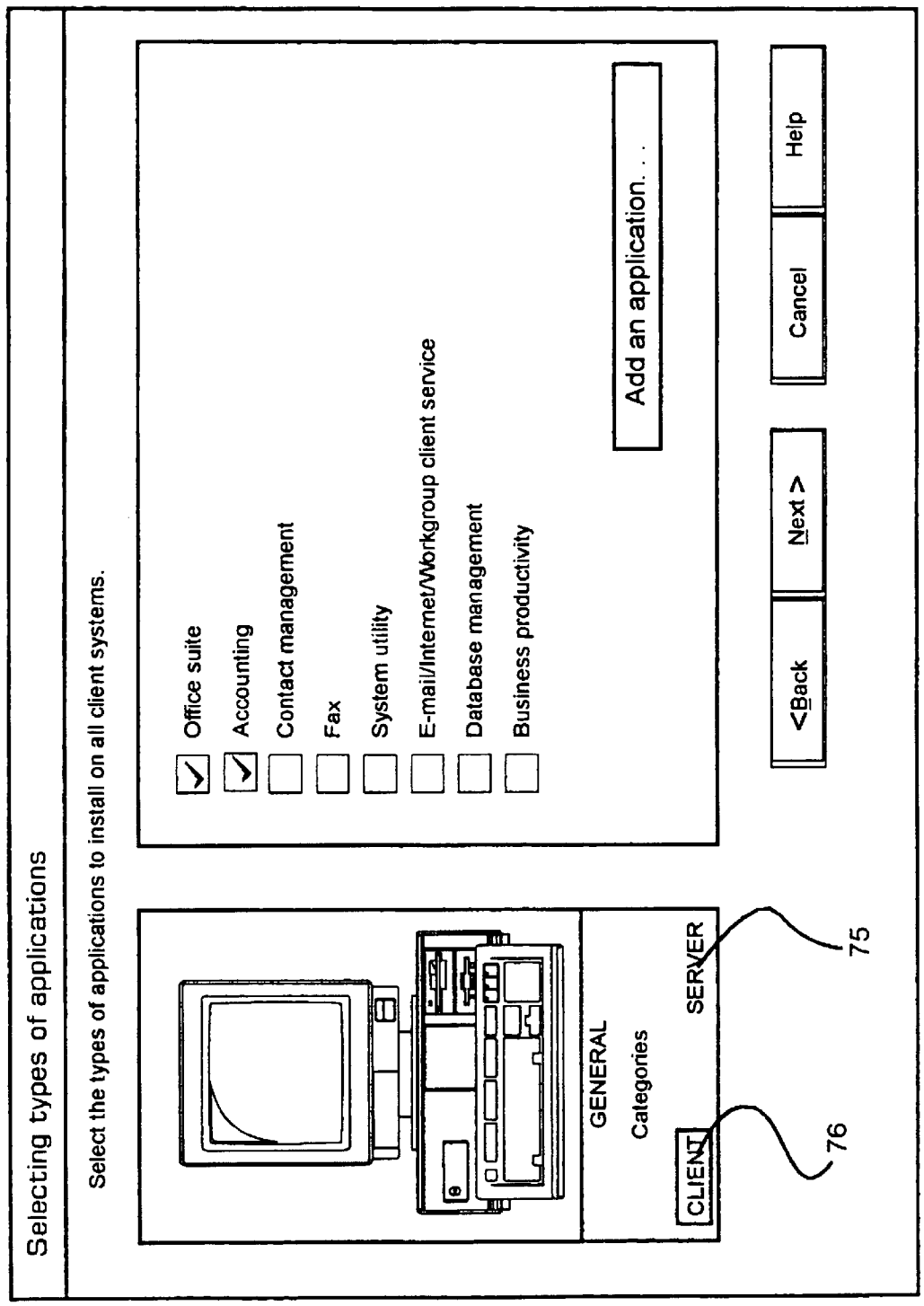
Figure 10:
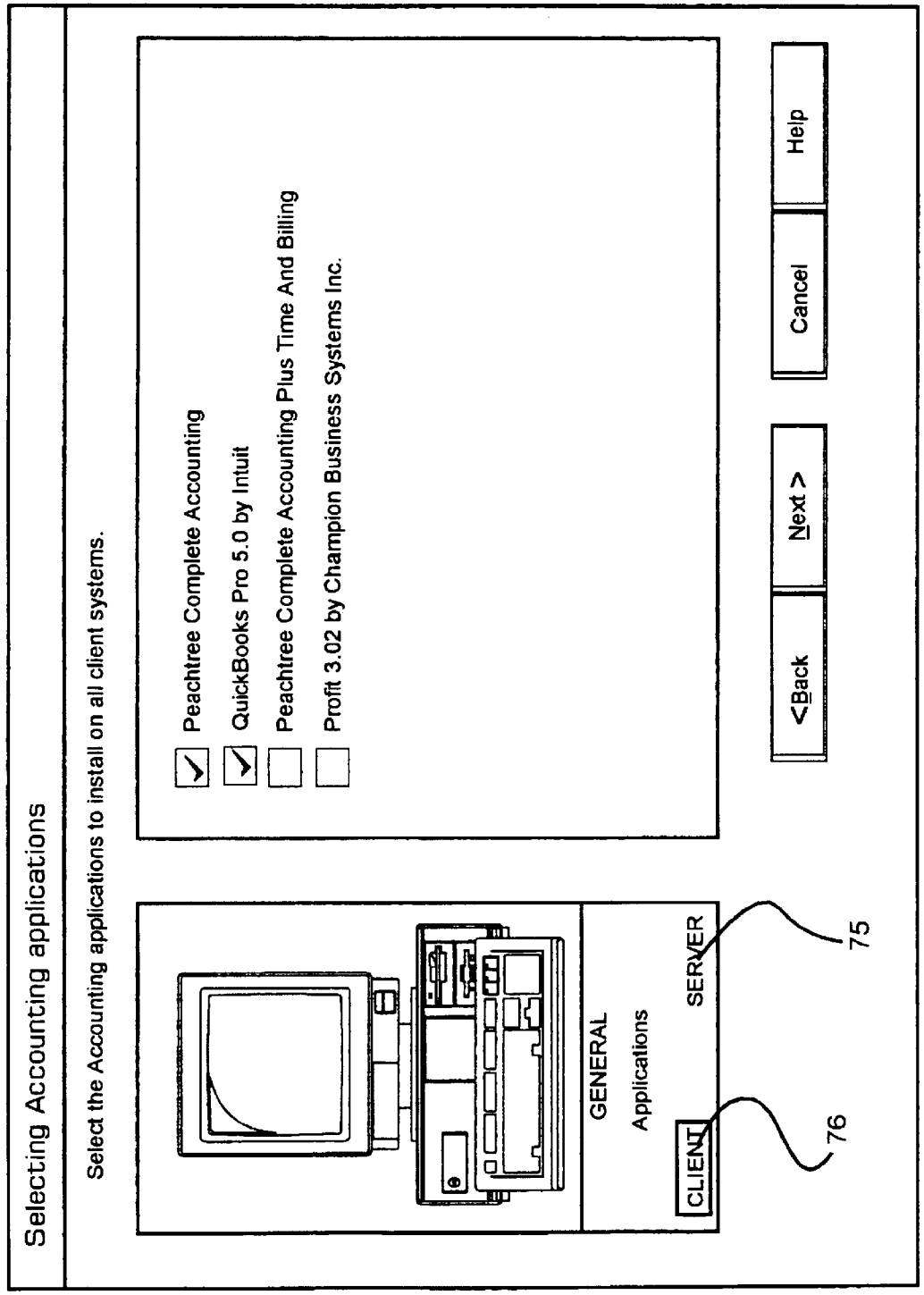

It should be noted that these data entry prompt panels are only a small group of potential data entry screens which may be used to get user data entries from which computer components to be allocated may be determined. For example, FIGS. 8 through 10 illustrate how the present invention may operate using the data entries in the system described in the above-mentioned copending application Ser. No. 09/078,934. FIG. 8 is a data entry panel prompting for database application components and drivers' selections for the server computer. Next, the screen of FIG. 9, applications to be installed on client (purchaser) computers are selected and more such selections for client (purchaser) computers are made through the screen of FIG. 10. Note that these selections are being made for clients as indicated by the activation of client button 76 rather than server button 75.

Figure 11:
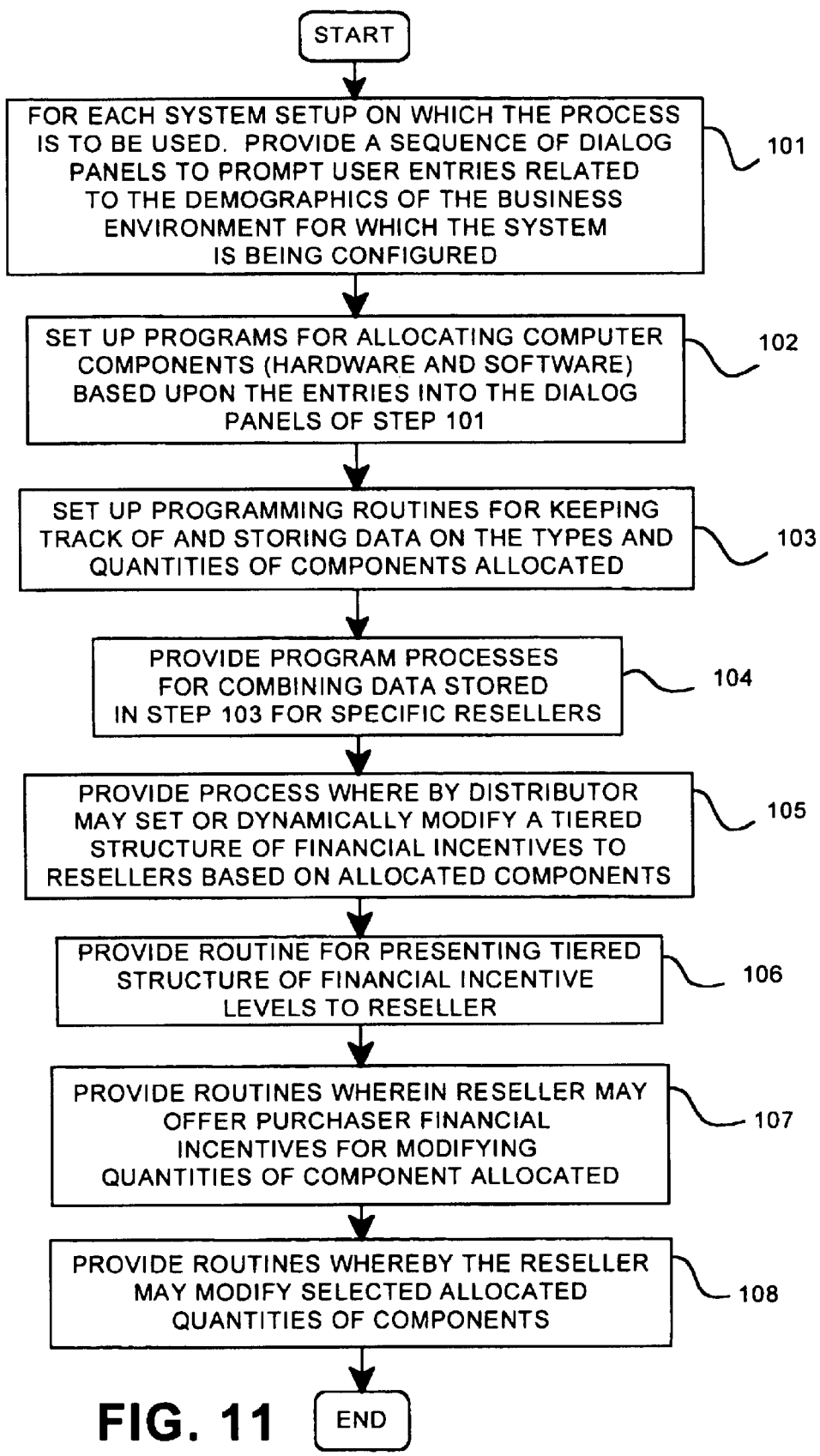
FIG. 11 is a flowchart of the basic elements of the process program carried out by the computers in the current system enabling the system to control the data entry and system configuration including the allocation and tracking of computer components used.

Now, with respect to FIG. 11 there will be generally described the basic elements of the programs which carry out the process of the present invention. Only for purposes of illustration, the present invention will use portions of the embodiments of the above-mentioned copending application Ser. Nos. 08/159,954 and 09/118,208. The programs of the present invention will be assumed to be in the reseller's server computer 50 which will enable the server to control the data entry and allocation operations described with respect to FIGS. 3 through 10. The server 50, FIG. 1, is set up with a program to transmit and display on any of purchaser display terminals 53 to 55, a sequence of dialog panels to prompt purchaser/user entries which are related to the demographics of the business environment of the purchaser, step 101. FIGS. 3 through 10 are illustrative of such panels. Then there is set up in the system, step 102, a series of appropriate algorithms for converting the entries, such as those in the panels of FIGS. 3 through 10, into means for allocating appropriate computer components (both hardware and software) for purchaser functions. As set forth in the referenced copending applications, any number of algorithms could be used for such conversions. Next, program routines are set up for tracking the allocated types and quantities of components and for storing the tracked data, step 103. Processes are set up, step 104, for combining data stored in step 103 during a plurality of transactions or configurations by the same seller or reseller. In other words, since the present invention involves determination of components installed or allocated from that reseller, some convenient process must be set up to combine such allocation data for that particular reseller. A simple illustration would be to set up a database for that particular seller or reseller which will track the types and quantities of components for the vendor over the time period. Since this is a dynamic interactive process involving ongoing interaction between reseller, distributer and purchasers, means are provided whereby the distributer may set or dynamically modify a tiered structure of financial incentive levels which will automatically be applied to the reseller based upon allocated components, step 105. It should be noted that the present process permits the distributer to dynamically modify the hierarchy of incentive levels as its business case changes. The distributer sets up and stores this hierarchy of incentive levels on his workstation server 57, and a routine is provided for transmitting this information to the reseller, step 106, via network 56, FIG. 1, to the reseller's display station 51. Further, in this interaction, routines are provided whereby the reseller, in order to reach potential incentive levels, may in turn offer to his purchasers, step 107, his own financial incentives for modifying quantities of allocated components which the purchaser agrees to receive. In addition, routines are provided whereby the reseller may modify allocations of particular components so that he may reach specific incentive levels, step 108, e.g. he may chose to receive and inventory additional components on behalf of purchasers in order to reach desirable incentive levels.

In connection with the process, it should be noted that the term "sellers" may be used interchangeably with term "resellers". The latter is merely a catch-all term for those who put together computer systems and networks using computer components provided by the manufacturers or the manufacturers' distributors of the computer components.

Now, with respect to FIG. 12 there will be described a modified program run to illustrate many of the steps involved in the prompts, data entries and storage of the entries described above for FIGS. 3 through 10, as well as the allocation, tracking and component allocation level comparisons of the present invention. In this illustrative program run, not all of the possible combinations of data entries and interactions will be described. However, it should be readily understood how other selections and data entries discussed with respect to the present invention may be similarly prompted for, selected, stored and used in algorithms.

Figure 12:
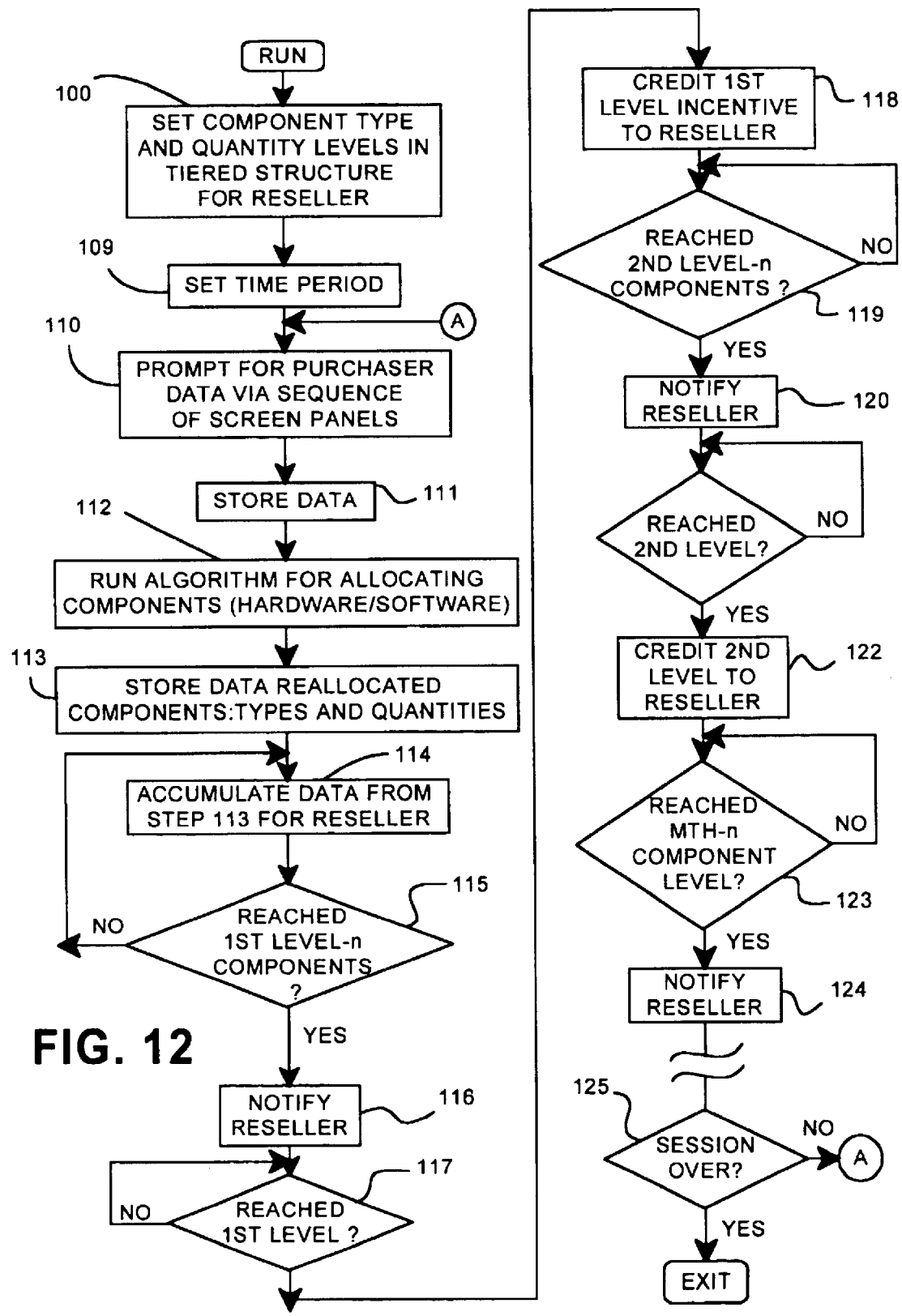
FIG. 12 is a flowchart of a simplified run illustrating the process of FIG. 11.

In the program run of FIG. 12, the tiered hierarchy of incentive levels is set up by the distributer for the reseller, step 100. Also, a time period is set, during which such levels must be reached, step 109. The particular purchaser-users are prompted for the user or purchaser data described above through a series of screen panels, step 110. The data obtained is stored, step 111. The appropriate algorithms for allocating hardware and software components are run, step 112, after which the data on allocated components, both hardware and software: types and quantities is tracked and stored, step 113. Then, step 114, the stored data developed in step 113 is accumulated and stored for the reseller. Then, decision step 115, a determination is made as to whether the quantities of component allocations for the reseller has reached the first level minus a quantity n, step 115. The purpose of this step is that if Yes, the reseller may be notified, step 116, of this preliminary state in order that he may have the option to take one of the interactions described above to bring the quantity up to the first incentive level. Obviously, n should be a relatively small quantity relative to the total quantity of the first level. If the decision from step 115 is No, then the process is returned to step 114 and the accumulation of data continues. Next, step 117, a determination is subsequently made as to whether the first incentive level has now been reached. If Yes, the reseller is automatically credited with the financial incentive for this first level, step 118. If No, the process is returned to step 117 and stands by until the first level is reached.

The process is continued with decision step 119 where a determination is made as to whether the quantities of component allocations for the reseller have reached the second level minus the quantity n. If Yes, the reseller is notified, step 120, of this preliminary state in order that he may have the option to take one of the interactions described above to bring the quantity up to the first incentive level. If the decision from step 119 is No, then the process is returned to step 119 and the accumulation of data continues. Next, step 121, a determination is subsequently made as to whether the second incentive level has now been reached. If Yes, the reseller is automatically credited with the financial incentive for this first level, step 122. If No, the process is returned to step 121 and stands by until the second level is reached. In a like manner, the process continues until the Mth or highest level is approached as indicated by a Mth minus n quantity resulting in a Yes decision from step 123 and a notification to the reseller, step 124. We will interrupt the description at this point with the understanding that a subsequent determination will be made as to whether the Mth level is reached.

Subsequent to this point a determination should be made, as illustrated by step 125, as to whether the session is over. Such a determination could include whether the time period has run out. If Yes, the session is exited. If No, the process could be returned via branch A to step 110, and continue with different purchasers or other computer components.

The described implementation of the present invention is as an application program made up of programming steps or instructions. Such a program 40 would be resident in RAM 14 of the server, FIG. 1, during computer operations. Until required by the computer system, the program instructions may be stored in another readable medium, e.g in disk drive 20, or in a removable memory, such as an optical disk for use in a CD-ROM computer input or in a floppy disk for use in a floppy disk drive computer input. Further, the program instructions may be stored in the memory of another computer prior to use in the system of the present invention and transmitted over a LAN or WAN, such as the Internet, when required by the user of the present invention. One skilled in the art should appreciate that the processes controlling the present invention are capable of being distributed in a variety of computer readable media forms.

Although certain preferred embodiments have been shown and described, it will be understood that many changes and modifications may be made therein without departing from the scope and intent of the appended claims.

What is claimed is:

1. A user interactive display computer system, accessed by both a distributer of computer components and a seller of computer systems using said components for configuring said computer systems comprising:

means for prompting system purchasers to make a sequence of interactive data entries, each of said entries relative to the data processing needs of a purchaser of one of said computer systems;

means for allocating said computer components to said computer systems based upon said data entries;

means for tracking the quantities of said computer components thereby allocated to computer systems sold by said seller to said purchasers during a selected time period;

means for presenting to the seller a tiered structure of financial incentive levels offered by the distributer based upon said quantities of allocated computer components; and means for enabling the distributer to dynamically modify the levels of said tiered structure of financial incentives.

2. The user interactive computer display system of claim 1 further including means for automatically crediting the financial incentives to said seller when financial incentive levels are reached.

3. The user interactive display computer system of claim 1 further including means enabling the seller to offer to the purchasers financial incentives for accepting seller proposed modifications in said allocated quantities of components to thereby permit the seller to reach said incentive levels.

4. The user interactive computer display system of claim 3 further including means for automatically crediting the financial incentives to said seller when financial incentive levels are reached.

5. The user interactive display computer system of claim 1 further including a communicating network of interactive computer display stations, said purchasers, seller and distributer accessing said system respectively through computer display stations.

6. A user interactive display computer system, accessed by both a distributer of computer components and a seller of computer systems using said components for configuring said computer systems comprising:

means for prompting system purchasers to make a sequence of interactive data entries, each of said entries relative to the data processing needs of a purchaser of one of said computer systems;

means for allocating said computer components to said computer systems based upon said data entries;

means for tracking the quantities of said computer components thereby allocated to computer systems sold by said seller to said purchasers during a selected time period;

means for presenting to the seller a tiered structure of financial incentive levels offered by the distributer based upon allocated computer components; and means enabling the seller to modify quantities of said components allocated responsive to said tracked quantities in relation to said tiered structure of financial incentives.

7. The user interactive display computer system of claim 6 further including means enabling the seller to offer to the purchasers financial incentives for accepting seller proposed modifications in said allocated quantities of components to thereby enable the seller to make said modifications.

8. The user interactive display computer system of claim 6 further including a communicating network of interactive computer display stations, said purchasers, seller and distributer accessing said system respectively through computer display stations.

9. In a user interactive display computer process, accessed by both a distributer of computer components and a seller of computer systems using said components for configuring said computer systems, steps comprising:

prompting system purchasers to make a sequence of interactive data entries, each of said entries relative to the data processing needs of a purchaser of one of said computer systems;

allocating said computer components to said computer systems based upon said data entries;

tracking the quantities of said computer components thereby allocated to computer systems sold by said seller to said purchasers during a selected time period;

presenting to the seller a tiered structure of financial incentive levels offered by the distributer based upon said quantities of allocated computer components, and enabling the distributer to dynamically modify the levels of said tiered structure of financial incentives.

10. The process of claim 9 further including the step of automatically crediting the financial incentives to said seller when financial incentive levels are reached.

11. The process of claim 9 further including the step of enabling the seller to offer to the purchasers financial incentives for accepting seller proposed modifications in said allocated quantities of components to thereby permit the seller to reach said incentive levels.

12. The process of claim 11 further including the step of automatically crediting the financial incentives to said seller when financial incentive levels are reached.

13. The process of claim 9 wherein said purchasers, seller and distributer access each other respectively through computer display stations in a communicating network of interactive computer display stations.

14. In a user interactive display computer process, accessed by both a distributer of computer components and a seller of computer systems using said components for configuring said computer systems, steps comprising:
   prompting system purchasers to make a sequence of interactive data entries, each of said entries relative to the data processing needs of a purchaser of one of said computer systems;
   allocating said computer components to said computer systems based upon said data entries;
   tracking the quantities of said computer components thereby allocated to computer systems sold by said seller to said purchasers during a selected time period;
   presenting to the seller a tiered structure of financial incentive levels offered by the distributer based upon allocated computer components, and
   enabling the seller to modify quantities of said components allocated responsive to said tracked quantities in relation to said tiered structure of financial incentives.

15. The process of claim 14 further including the step of enabling the seller to offer to the purchasers financial incentives for accepting seller proposed modifications in said allocated quantities of components to thereby permit the seller to make said modifications.

16. The process of claim 14 wherein said purchasers, seller and distributer access each other respectively through computer display stations in a communicating network of interactive computer display stations.

17. A computer program having program code included on a computer readable medium operable in a user interactive display computer system accessed by both a distributer of computer components and a seller of computer systems using said components for configuring said computer systems comprising:
   means for prompting system purchasers to make a sequence of interactive data entries, each of said entries relative to the data processing needs of a purchaser of one of said computer systems;
   means for allocating said computer components to said computer systems based upon said data entries;
   means for tracking the quantities of said computer components thereby allocated to computer systems sold by said seller to said purchasers during a selected time period;
   means for presenting to the seller a tiered structure of financial incentive levels offered by the distributer based upon said quantities of allocated computer components; and
   means for enabling the distributer to dynamically modify the levels of said tiered structure of financial incentives.

18. The computer program of claim 17 further including means for automatically crediting the financial incentives to said seller when financial incentive levels are reached.

19. The computer program of claim 17 further including means enabling the seller to offer to the purchasers financial incentives for accepting seller proposed modifications in said allocated quantities of components to thereby permit the seller to reach said incentive levels.

20. The computer program of claim 19 further including means for automatically crediting the financial incentives to said seller when financial incentive levels are reached.

21. The computer program of claim 17 further including a communicating network of interactive computer display stations, said purchasers, seller and distributer accessing said system respectively through computer display stations.

22. A computer program having program code included on a computer readable medium operable in a user interactive display computer system accessed by both a distributer of computer components and a seller of computer systems using said components for configuring said computer systems comprising:
   means for prompting system purchasers to make a sequence of interactive data entries, each of said entries relative to the data processing needs of a purchaser of one of said computer systems;
   means for allocating said computer components to said computer systems based upon said data entries;
   means for tracking the quantities of said computer components thereby allocated to computer systems sold by said seller to said purchasers during a selected time period;
   means for presenting to the seller a tiered structure of financial incentive levels offered by the distributer based upon allocated computer components; and
   means enabling the seller to modify quantities of said components allocated responsive to said tracked quantities in relation to said tiered structure of financial incentives.

23. The computer program of claim 22 further including means enabling the seller to offer to the purchasers financial incentives for accepting seller proposed modifications in said allocated quantities of components to thereby enable the seller to make said modifications.

24. The computer program of claim 22 further including a communicating network of interactive computer display stations, said purchasers, seller and distributer accessing said system respectively through computer display stations.

* * * * *